United States Patent [19]

Sawada et al.

[11] Patent Number: 5,294,202

[45] Date of Patent: Mar. 15, 1994

[54] BAR-CODE PRINTING DEVICE

[75] Inventors: Akihiro Sawada; Hideo Ueno; Shoji Sakuragi, all of Nagoya, Japan

[73] Assignee: Brother Kogyo Kabushiki Kaisha, Nagoya, Japan

[21] Appl. No.: 28,263

[22] Filed: Mar. 9, 1993

[30] Foreign Application Priority Data

Jun. 5, 1992 [JP] Japan .................................. 4-173845

[51] Int. Cl.⁵ .............................................. B41J 5/00
[52] U.S. Cl. ..................... 400/103; 358/470;
395/102; 395/110; 395/145
[58] Field of Search ............... 400/103; 358/467, 470,
358/440; 235/60.15, 494, 462; 395/102, 110,
150, 151, 144, 145

[56] References Cited

U.S. PATENT DOCUMENTS 5,115,326  5/1992  Burgess et al. .................. 358/440

FOREIGN PATENT DOCUMENTS 2-106555  4/1990  Japan .

Primary Examiner—Eugene H. Eickholt
Attorney, Agent, or Firm—Oliff & Berridge

[57] ABSTRACT

In a printing device for printing bar-codes, a string of characters and symbols representing the contents of the bar-codes are printed under the bar-codes by replacing the lower part of the dot pattern with the dot pattern for the string. The present invention is characterized in that the printing device has a decision means for deciding whether or not to print characters and for printing bar-codes with a sufficient height for reading operation by bar-code readers. The printing device automatically omits the string of characters when a character size set by an operator is not large enough to print a string and a bar-code in juxtaposition.

20 Claims, 11 Drawing Sheets

BAR-CODE PRINTING DEVICE

BACKGROUND OF THE INVENTION

1. Field of the Invention

The present invention relates to a bar-code printing device, and more particularly to a bar-code printing device with a function to omit a string of characters and symbols representing the contents of the bar-code when the set character size is found to be smaller than a prescribed value.

2. Description of Related Art

Bar-codes according to such specifications as JAN (Japan Article Number), EAN (European Article Number), and Code 39 have been popularly used as identifiers for distinguishing articles. Parcels and labels often carry such bar-codes printed thereon.

Normally, the bar-code has a string of characters and symbols representing the contents of the bar-code printed in juxtaposition on the lower end so that one can easily understand the contents of the bar-code. However, there is a technical requirement on the height of the bar-code, that is, the height of the bar of the bar-code is 6.35 mm (a quarter of an inch) or greater for ensuring stable read-out of the bar-code readers. When the height of the bar of the bar-code becomes far less than the recommended value of 6.35 mm, an unstable performance of the bar-code reader results.

SUMMARY OF THE INVENTION

It is an object of the present invention to provide a bar-code printing device with a function to enlarge the bar-code across the height for a smaller error rate in the bar-code reading operation.

The bar-code printing device according to the invention has an input means for inputting characters, data storage means for storing data on characters and bar-codes input from the input means, and print means including a print head consisting of a plurality of dot-like printing elements for printing characters and bar-codes on a print medium, and further comprises: size setting means for setting a common size for the characters and bar-codes so that printed images have an identical height; decision means for deciding whether or not the size set by said size setting means is greater than a prescribed value; pattern data combination means for combining dot pattern data of the size after receiving the data on characters and bar-codes from said size setting means; and pattern data re-combination means for combining the fixed height of the lowermost part of the bar-code into a string of characters and symbols representing the contents of the bar-code, when said decision means finds that the size set by said size setting means is greater than the prescribed value.

In the tape printing device, the data on the characters and bar-codes are stored in the data storage means, and the size setting means sets a common size for the characters, including alphabetic characters, numerics and symbols for example, so that they have an identical height. The pattern data combination means combines the dot pattern data for the characters in a size set by the size setting means. In the data combination process, if the decision means finds that the size set by the size setting means is greater than the prescribed value, the pattern data re-combination means replaces the lowermost part of the bar-code with an image for a string of characters corresponding to the contents of the bar-code. The bar-code printing device executes printing according to the re-combined image.

Otherwise, if the size is found to be smaller than the prescribed value, the bar-codes are printed across the entire height of the characters, reducing the error rate in read-out operation with a bar-code reader.

Accordingly, the bar-code printing device having size setting means, decision means, pattern data combination means and pattern data re-combination means prints bar-codes and juxtaposed strings of characters representing the contents of the bar-codes when the character size is greater than a determined criterion.

Further, if the character size is found to be smaller than a determined criterion, the bar-codes are printed across the height of the characters size, ensuring stable reading results by a bar-code reader.

DETAILED DESCRIPTION OF PREFERRED EMBODIMENTS

Hereinafter, a preferred embodiment of the present invention is described with reference to the appended figures.

The keyboard 3 has character keys for inputting alphabetic characters, numerals and symbols, a space key, a return key, cursor location keys for sending the cursor leftward or rightward, a text editing key for editing text, a bar-code key for inputting bar-code data, a format setting key for setting the format of the printed characters, a termination key for terminating input/edit operation, a cancel key for canceling various edit operations, a print execution key for initiating the print execution and a power key for controlling the power supply.

Figure 1:
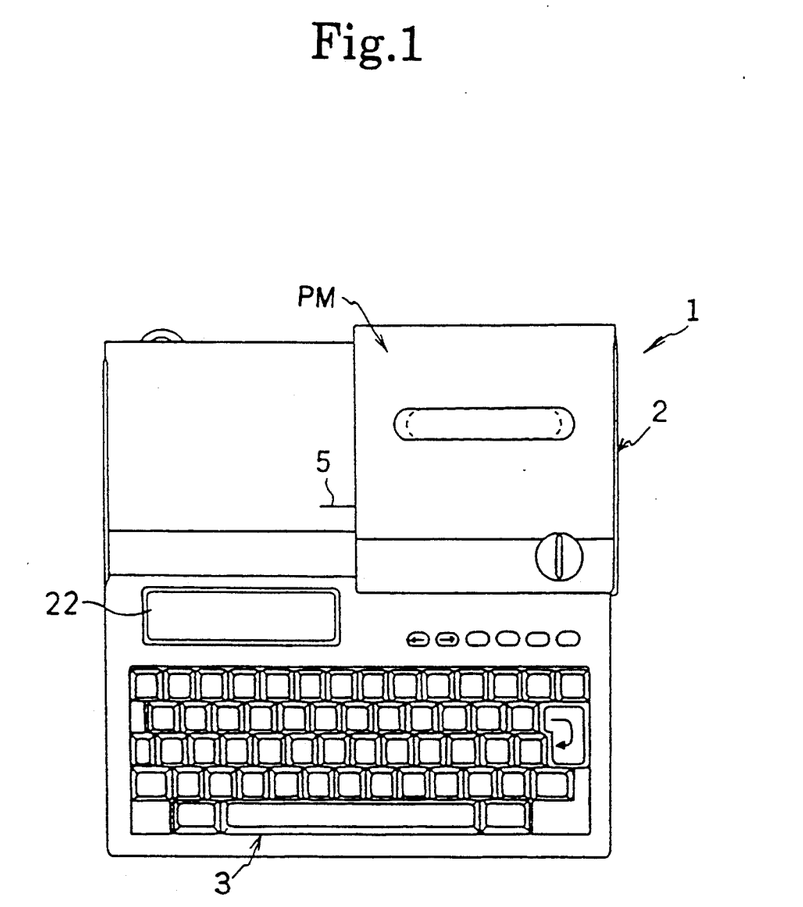
FIG. 1 is a plan view of the tape printing device in accordance with the present invention.
Figure 2:
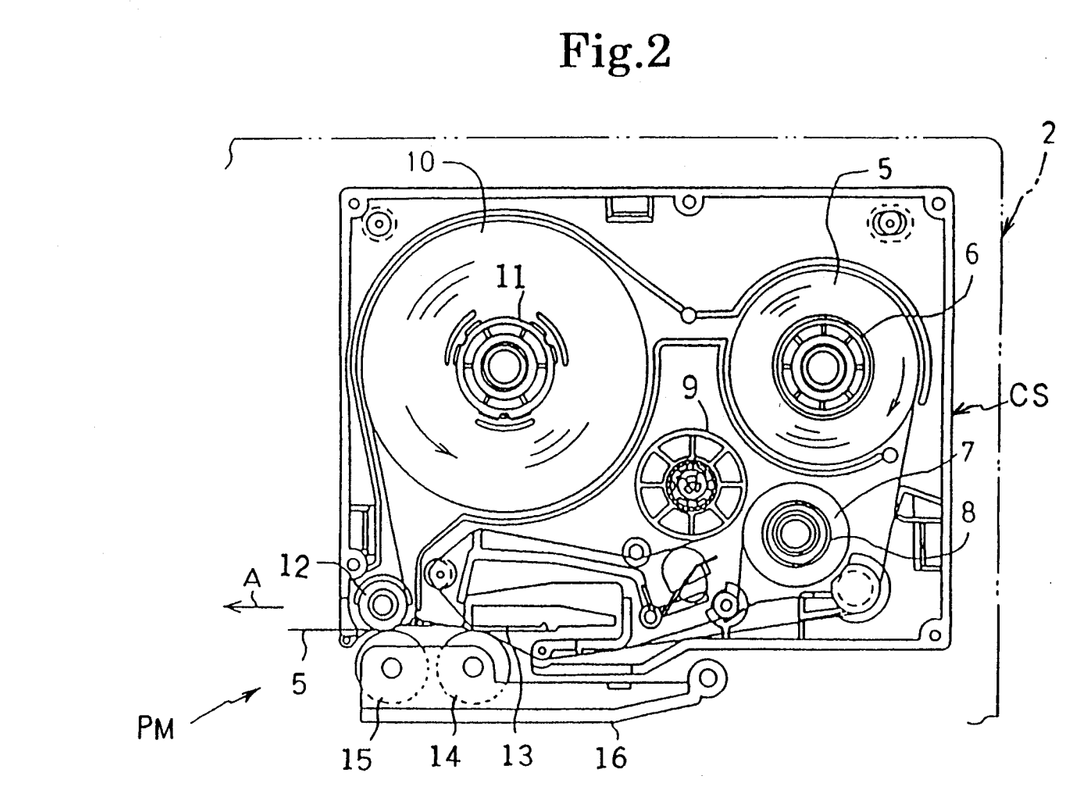
FIG. 2 is a plan view schematically depicting the print mechanism.

A brief description of the print mechanism PM is given with reference to FIG. 2. A tape cassette CS in the shape of a rectangular block is detachably installed to the print mechanism PM. The tape cassette CS houses a tape spool 6 to which a tape print medium 5 consisting of a transparent film of preferably 24 mm in width is wound, a ribbon supply spool 8 to which an ink ribbon 7 is wound, a supply spool 11 to which a double-sided adhesive tape 10 with a releasable sheet secured on the outer face of the tape roll is wound, and a contact roller 12 rotatably provided for contacting the tape print medium 5 with the double-sided adhesive tape 10.

A thermal head 13 is provided upright at a position where the tape print medium 5 and the ink ribbon 7 overlap. A platen roller 14 for urging the tape print medium 5 and the ink ribbon 7 against the thermal head 13 and a sending roller 15 are rotatably supported on a supporting member 16. The thermal head 13 preferably has 128 thermal elements along a perpendicular line.

In the above construction, the tape sending motor 24 (shown in FIG. 3) drives the contact roller 12 and the take up spool 9 in synchronism in a fixed direction, the electrically activated thermal elements print images by a plurality of dot columns, and the tape print medium 5 is sent in the direction A with the double-sided adhesive tape 10 secured on one side. A more detailed description of the printing mechanism PM is contained in Japanese Laid-Open Patent Publication No. 2-106555.

Figure 3:
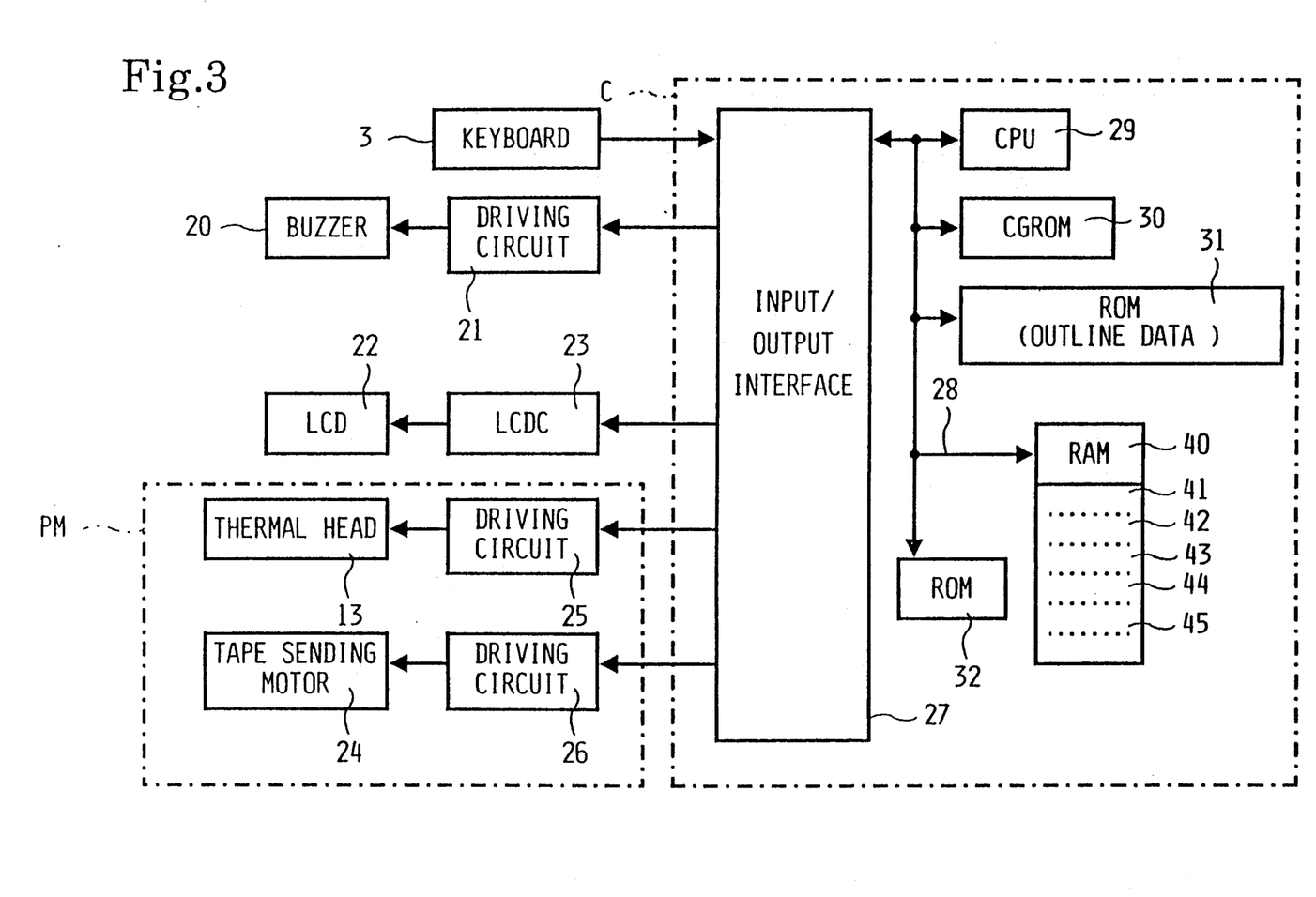
FIG. 3 is a block diagram of a control system in the tape printing device.

The control system of the tape printing device is shown in the block diagram in FIG. 3. The keyboard 3, a display controller (LCDC) 23 including a RAM for displaying patterns on a liquid crystal display (LCD) 22, a driving circuit 25 for driving the thermal head 13, a driving circuit 26 for driving a tape sending motor 24, and a driving circuit 21 for a warning buzzer 20 are connected to an input/output interface 27 in the controller C. The controller C consists of a CPU 29, the input/output interface 27, a CGROM 30, ROMs 31, 32 and a RAM 40.

The CGROM (pattern data memory) 30 stores dot pattern data corresponding to a plurality of character codes. The ROM (outline data memory) 31 stores data on contourings of characters (outline data) corresponding to character codes classified according to font styles (e.g. Gothic font, MINCHO-KANJI font).

The ROM 32 stores a display drive control program for controlling the display controller 23 based on the code data of the alphabetic characters, numerals, and symbols input from the keyboard 3, an image process control program for converting outline data corresponding to code data stored on the text memory 41 into dot pattern data to be spread on the print buffer 44, a print drive control program for driving the thermal head 13 and the tape sending motor 24 after sequentially reading out data stored on the print buffer 44 and a print drive control program for controlling the tape print control process which is unique to the present invention (described later), and the like. In the above construction, the tape print control process includes a bar-code data conversion subroutine for converting code data stored on the text memory 41 into bar-code data according to such standards as JAN (Japan Article Number), EAN (European Article number).

The text memory 41 allocated on the RAM 40 stores data characters corresponding to the text data, bar-code data, and the like input from the keyboard 3. A print format memory 42 stores format information such as character size SZ and font data. A bar-code buffer 43 stores character data which includes digits for printing the bar-code by a plurality of print lines. The print buffer 44 stores dot pattern data for characters decoded into image data and dot patterns for printing bar-codes. A print pointer (having a value PP) 45 holds an index address of the text memory 41 for reading out code data.

Now, the tape print control routine executed by the controller C of the tape printing device 1 is described with reference to the flowchart in FIG. 4. A symbol Si (i=10, 11, 12 . . .) corresponds to a single step in the flowchart.

Applying power to the tape printing device 1 invokes the control routine, pressing the text editing key starts a text data input process for transferring text data including characters, and pressing the bar-code key starts a bar-code data input process control to be described later (S10).

In the next step (S40), an operator can set various formats and fonts by operating the print format key or the font key.

In the above size setting process, operating the size key causes the tape printing device to display a size setting console, allowing the operator to set a character size with a cursor key. Pressing the termination key causes the print format memory 42 to store the size SZ for the selected characters at the termination.

After the above operation, pressing the print execution key starts a dot pattern combination process for spreading the dot pattern data for characters and bar-codes on the print buffer, followed by the print execution by the print mechanism PM (S50) to resume operation in S10.

Figure 5:
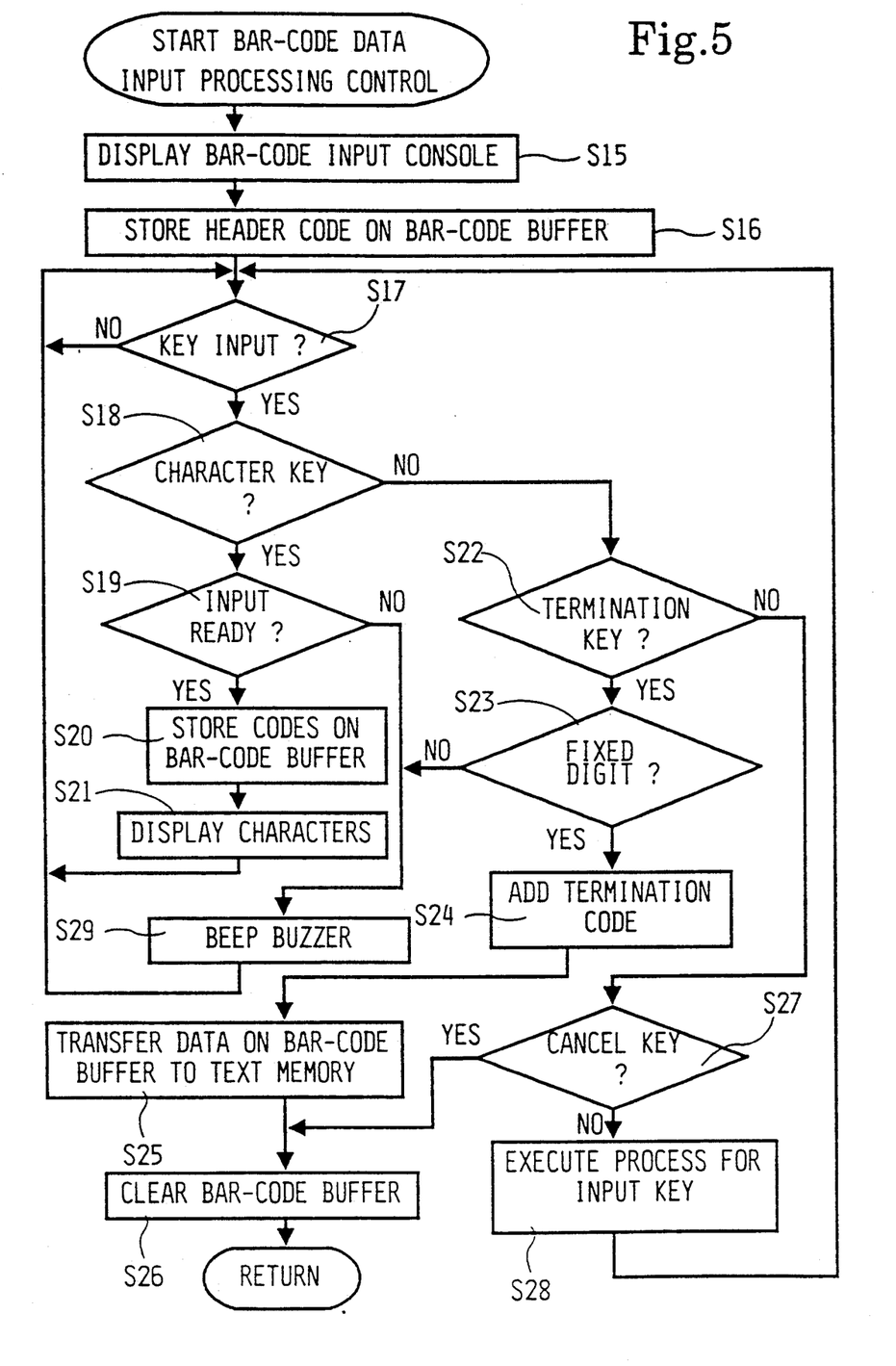
FIG. 5 is a flowchart illustrating the bar-code data input process control routine.
Figure 8:
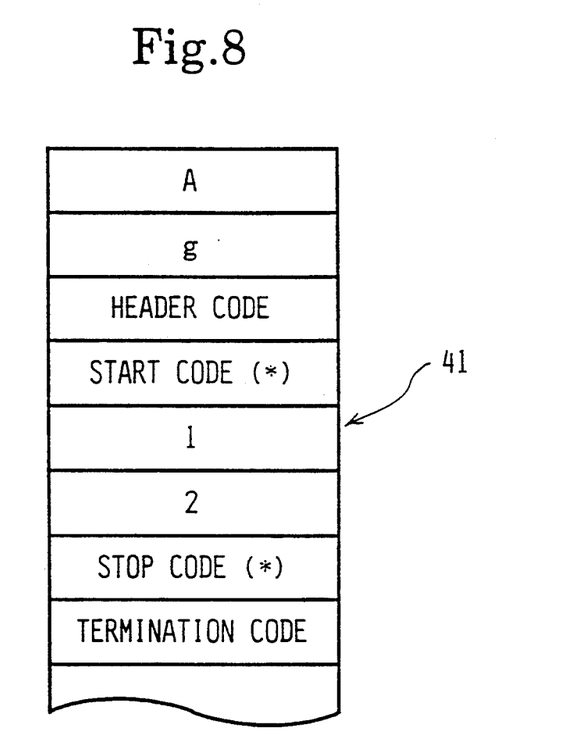
FIG. 8 is a chart describing the data structure on the text memory.

The bar-code data input process control routine is described with reference to the flowchart in FIG. 5. In the description, a character string "Ag" is assumed to be stored on the text memory 41 at the initiation of the process as shown in FIG. 8.

Figure 9:
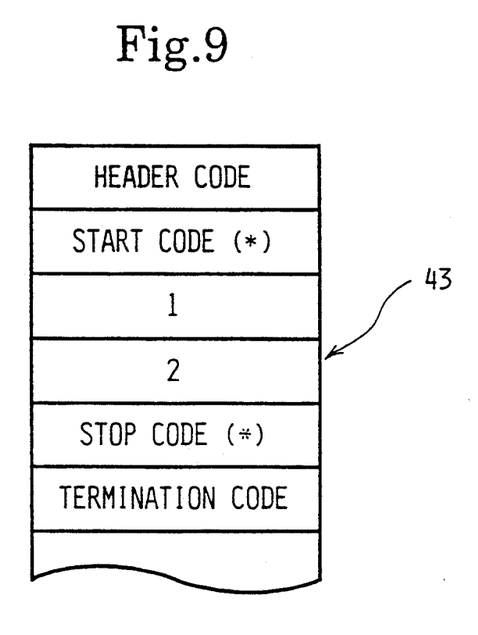
FIG. 9 is a chart describing the data structure on the bar-code buffer.
Figure 10:
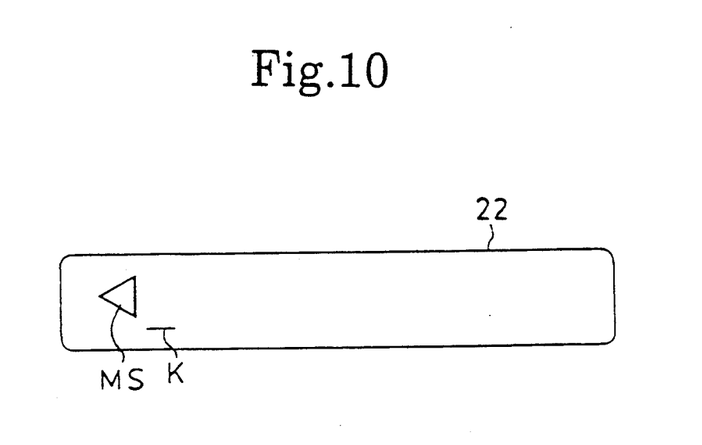
FIG. 10 is a drawing illustrating the data input console.
Figure 11:
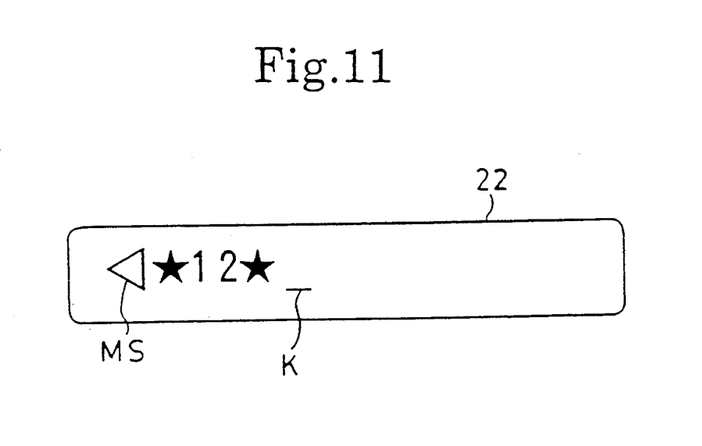
FIG. 11 is a drawing illustrating the data input console when a code corresponding to a data character is input.
Figure 12:
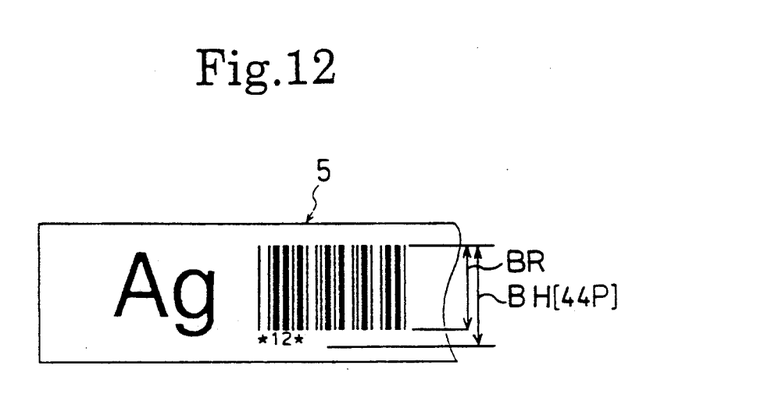
FIG. 12 is a drawing illustrating printed characters and bar-codes in 44 points.

The above Control routine activates a bar-code input mode and displays a bar-code input console (S15). A header code is stored on the bar-code buffer 43 (S16). if the tape printing device selects a bar-code standard 'code 39'a start code "*" is added to the header code in S16. As shown in FIG. 10, if a start code for a left-pointed triangle MS is displayed at the top display area of the display 22, a header code and a start code "*" are stored at the start address of the bar-code buffer 43 as shown in FIG. 9 in the 'code 39' mode. The symbol "K" in FIGS. 10 and 11 represents the cursor.

When a character key including a numeric key is pressed in the bar-code input mode (S17, S18:YES), the process advances to the input ready step (S19). If the number of numeric characters stored on the bar-code buffer 43 is less than a fixed number of digits and additional characters can be input (S19:YES) (e.g JAN bar-code standard), the character code is stored on the bar-code buffer 43 (S20), and characters corresponding to the character code appear on the display 22 (S21). The tape printing device then returns operation in S17. For example, the state of the display 22 appears as shown in FIG. 11 after numeric characters "12" are input in the 'code 39' mode.

In the next step, when the termination key is pressed to end the character input (S17:Yes, S18:No, S22:Yes), the fixed digit step (S23) determines the number of numeric codes stored on the bar code buffer 43. If a fixed digit of numeric codes are stored on the bar-code buffer 43 (S23:Yes) , a bar-code termination code is added to the code data stored on the bar-code buffer 43, all the character strings on the bar-code buffer 43 are transferred to the text memory 41 (S25) and the bar-code buffer 43 is erased (S26), thus terminating the control process to resume the tape print control operation. If the bar-code standard 'code 39' is selected in the above operation, a stop code "*" is added to the end of the code in S24. For example, as shown in FIG. 9, all the codes in the bar-code buffer including data characters for the bar-code in the 'code 39' standard in FIG. 9 are added to the codes in the text memory 41.

If the cancel key is pressed (S17:Yes, S18, S22:No, S27:Yes), the bar-code buffer 43 is cleared (S26), the operation is terminated and the tape print control is resumed. If a character key is pressed when the fixed length of numeric characters are stored on the bar-code buffer 43 (S17, S18:Yes, S19:No) or the termination key is pressed while the bar-code buffer has not stored the fixed length of numeric characters on the bar-code buffer 43 (S23:No), the buzzer 20 beeps before a warning is issued (S29), and the operation in S17 is resumed.

Pressing a key other than a character key, a termination key or a cancel key (S17:Yes, S18, S22, S27:No) starts a process corresponding to the input key (S18) before the operation is resumed in S17.

Figure 6:
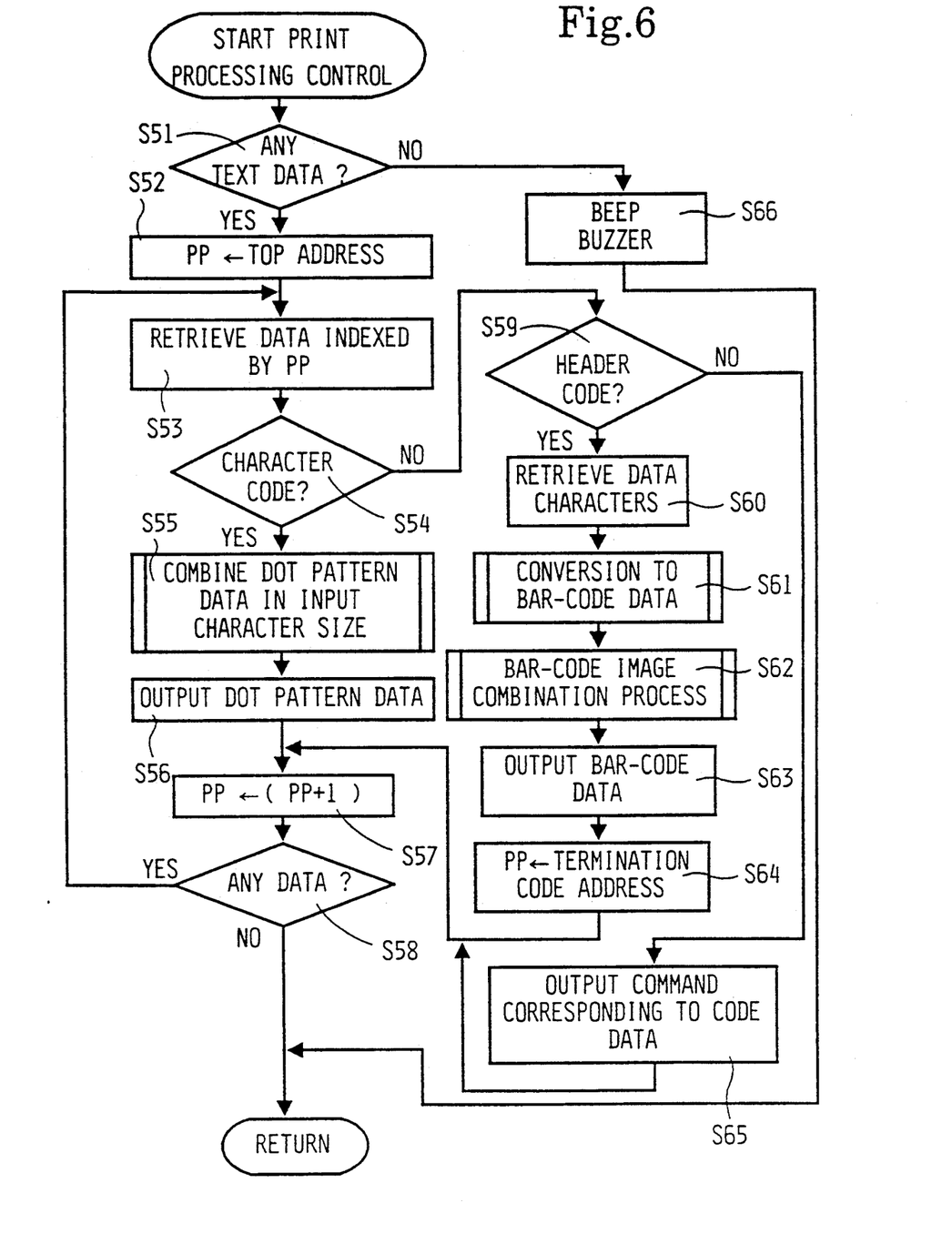
FIG. 6 is a flowchart illustrating the print process control routine.

A print process control routine is illustrated in the flowchart in FIG. 6. The routine is invoked by the print execution key.

In the initial step of the process, if any text data is found on the text memory 41 (S51:Yes), the print pointer PP loads a top address of the text memory (S52). If the code data addressed by the print pointer PP is found to be a character code (S53, S54:Yes), a magnification power is calculated from the preset character size. The magnification power is used in enlarging or condensing the outline characters to generate dot pattern images to be printed by the print mechanism PM (S56).

In the next step, the print pointer value PP is incremented by 1 (S57), and if any code data exists on the text memory 41 (S58:Yes), S53 and the following steps are repeated.

If the code data is found to be a header code (S53, S54:No, S59:Yes), data characters on the next address through the end address are read (S60). The data characters are converted into a bar-code by the bar-code data conversion process control (S61), and the image combination process (shown in FIG. 7) converts the bar-code data to image data (S62).

Figure 7:
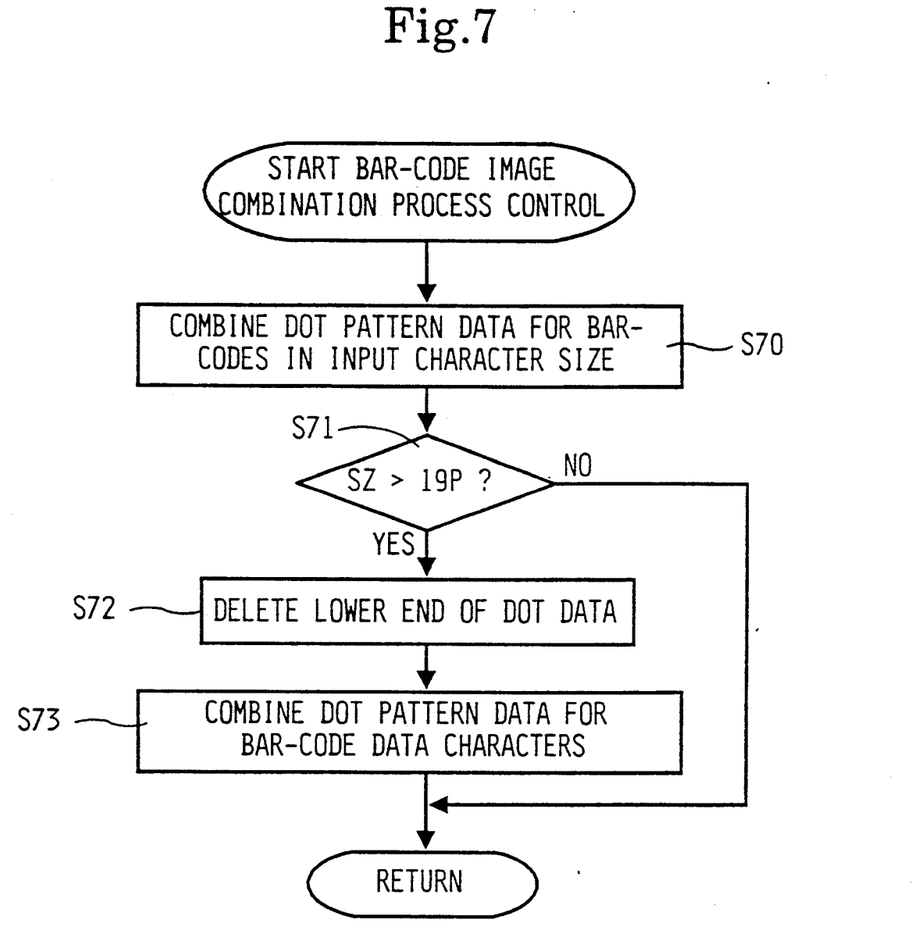
FIG. 7 is a flowchart illustrating the bar-code image combination process.

In the image combination process, the net height of the bar BR is given by subtracting the height of juxtaposed alphabetic characters or numerals from the height of the bar-code BH, where BR gives the height of the bar-code to be scanned by bar-code readers. A bar BR having a net height greater than or equal to about 4.4 mm (31 dots) does not have significant influence on the performance of the bar-code readers. In other words, since the juxtaposed character string has a fixed height of about 2.4 mm (17 dots), a bar-code with the height BH of 19 points (about 6.7 mm) or more does not have a negative influence in the reading operation. Accordingly, in this image combination process, characters are imposed on the lowermost part of the bar-code as long as the value BH gives a corresponding character size SZ of 19 points or greater, where one point equals to 1/72 of and inch (25.4 mm/72) and the printing device has a dot density of 180 dpi (25.4 mm/180).

After the image combination process is initiated, dot pattern data with given character sizes is generated according to the size data SZ stored on the print format memory 42 and spread on the print buffer 44 (S70). Following the above process, if the size data value SZ is found to be 19 points or greater, that is, the height of the dot pattern BH is 6.7 mm (48 dots) or greater (S71:Yes), the lowermost part of the dot pattern data is deleted by a height of 17 dots. The image data of alphabetic characters, symbols or numerals (the so-called juxtaposed characters) are combined (S73) on the deleted area, terminating the process and starting the print process control in S63. In this condition, the net height of the bar BR is about 7.4 mm (31 dots).

In the above examination, if the size data SZ is found to be smaller than 19 points (S71:No), the image combination process is terminated and the print process control is invoked in S63 so that the BH has a sufficient value.

In the next step, the dot pattern data for the bar-code stored on the print buffer 44 is sent to the print mechanism PM for print execution (S63). The print pointer PP loads the address of the termination code (S64), and S57 and the following steps are executed.

In the print execution, if the code data is found to be neither a character code nor a header code, for example, a space code (S53, S54, S59:No), a command corresponding to the code data is issued to the print mechanism PM (S65), and S57 is executed.

Figure 4:
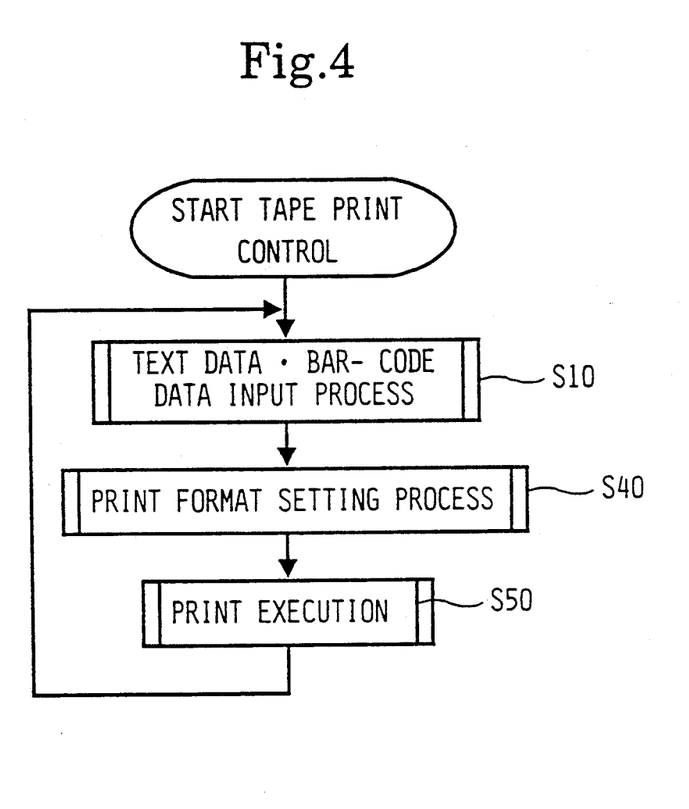
FIG. 4 is a flowchart illustrating the tape print control routine.

After the print execution is completed for all the data stored in the text memory 41 (S58:No), the tape printing device resumes the tape print control operation shown in FIG. 4. If no text data is found on the text memory 41 at the initial stage of the print execution process (S51:No), the buzzer 20 beeps and the control returns to the tape print control shown in FIG. 4.

Figure 13:
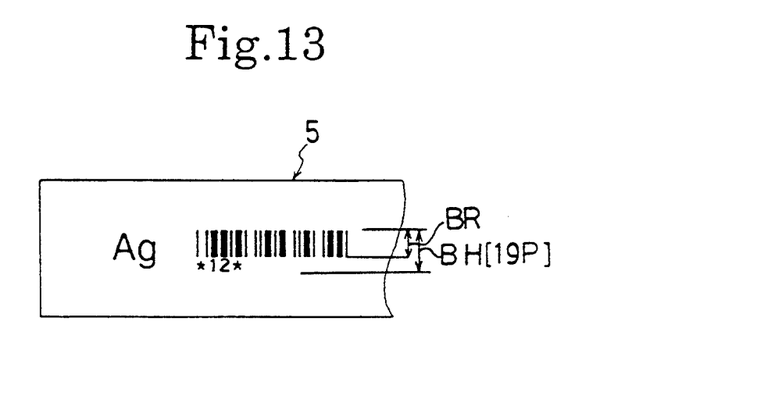
FIG. 13 is a drawing similar to FIG. 12, but where characters are printed in 19 points.
Figure 14:
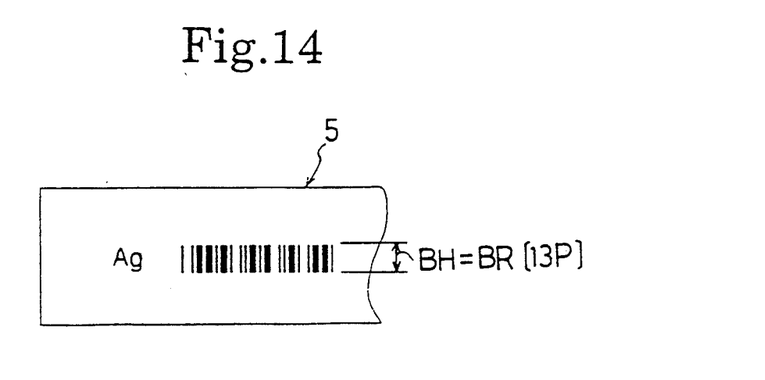
FIG. 14 is a drawing similar to FIG. 12, but where characters are printed in 13 points.

In the following step, as shown in FIG. 8, if the character size is set at 44 points for the characters and bar-codes stored on the text memory 41, the string "Ag" and bar-codes are printed on the tape medium 5 simultaneously. In this case, characters are juxtaposed under the bar-code because the height of the bar-code BH is 110 dots (about 15.5 mm). When the character size is set at 19 points, characters and bar-code are printed in 19 points as shown in FIG. 13 in accordance with the above description. The characters are juxtaposed under the bar-code because the height of the bar-code is 48 dots (about 6.7 mm). However, if the character size is found to be 13 points, the characters and bar-code are printed in 13 points without juxtaposed characters because the BH is 33 dots (about 4.6 mm in height).

As described thus far, if the character size SZ is found to be a fixed value or greater, for example 19 points, characters are printed under the bar-code with the net height of the bar-code BR kept greater than a criterion of 4.4 mm (31 dots) without a negative impact on the read-out results.

On the other hand, for example, if the character size SZ is smaller than 19 points, the bar-code is printed in dot pattern data generated in the character size SZ across the height of the characters, ensuring stable reading results by a bar-code reader.

Besides the above embodiment, the criterion for the character size SZ can be set at a size larger than 19 points or at 25 points for preserving the criteria of the bar height (about 6.35 mm) . The present invention has diverse applications in bar-code printing devices with a print mechanism for printing bar-codes, numeric characters and symbols in dot patterns. Other advantages and modifications will be apparent to those skilled in the art without departing from the scope of the invention as defined in the appended claims.

What is claimed is:

1. A bar-code printing device for printing a bar-code having at least a minimum height and for selectively printing characters associated with the bar-code, the device comprising:
   inputting means for inputting character data for characters associated with the bar-code including a size of the characters and bar-code data including a minimum height for the bar-code;
   memory means for storing the input character data and the bar-code data;
   bar-code height adjustment means for adjusting a net height of the bar-code so that the bar-code is printed with at least the minimum height, including total height calculating means for calculating a total height of the bar-code and associated characters, and determining means for determining whether the net height of the bar-code exceeds the minimum height based on the total height and the size of the characters; and
   print means for printing the bar-code and for selectively printing the associated characters.

2. The bar-code printing device of claim 1, wherein the total height calculating means comprises data combination means for combining character data and bar-code data.

3. The bar-code printing device of claim 1, wherein the bar-code height adjustment means adjusts the net height of the bar-code when the determining means determines that the net height of the bar-code exceeds the minimum height.

4. The bar-code printing device of claim 3, wherein said bar-code height adjustment means deletes a portion of the bar-code and inserts the associated characters thereof.

5. The bar-code printing device of claim 1, wherein said memory means stores header codes, numeric codes and termination codes.

6. The bar-code printing device of claim 5, further comprising numeric code determination means for determining whether a fixed number of numeric codes are stored in the memory means.

7. The bar-code printing device of claim 6, further comprising warning means for warning an operator when the fixed number of numeric codes are stored in the memory means and additional input is attempted, and for warning an operator when the fixed number of numeric codes are not stored in the memory means and printing is attempted.

8. The bar-code printing device of claim 1, wherein when the determining means determines that the net height of the bar-code is equal to or less than the minimum height, the print means prints only the bar-code.

9. A bar-code printing device for printing a bar-code having at least a minimum height and for selectively printing characters associated therewith, comprising:
   a memory for storing the character data for characters associated with the bar-code, including character size, and bar-code data for the bar-code including a minimum height;
   a bar-code height adjuster coupled to the memory for adjusting a height of the bar-code based on a total height of the bar-code and associated characters so that the bar-code is printed with at least the minimum height; and
   a printer for printing the bar-code based on the data stored in the memory and adjusted by the bar-code adjuster and selectively printing associated characters based on the adjusted height of the bar-code.

10. The bar-code printing device of claim 9, wherein the bar-code height adjuster combines character data and bar-code data for printing.

11. The bar-code printing device of claim 10, wherein the bar-code height adjuster calculates the total height of the bar-code and the characters.

12. The bar-code printing device of claim 9, wherein the bar-code height adjuster calculates the height of the bar-code and determines whether the height exceeds the minimum height of the bar-code.

13. The bar-code printing device of claim 12, wherein the bar-code height adjuster compares the height of the bar-code with the minimum height to determine whether the height of the bar-code exceeds the minimum height of the bar-code.

14. The bar-code printing device of claim 13, wherein the bar-code height adjuster adjusts the height of the bar-code when the height of the bar-code is determined to exceed the minimum height.

15. The bar-code printing device of claim 14, wherein said bar-code height adjuster deletes a portion of the bar-code and inserts the associated characters therefor.

16. The bar-code printing device of claim 9, further comprising an alarm that warns an operator when certain bar-code data is stored in the memory and additional input is attempted, and for warning an operator when certain bar-code data is not stored in the memory and printing is attempted.

17. The bar-code printing device of claim 9, further comprising a magnifier that calculates a magnification power from the input character size for printing.

18. A method of printing a bar-code and selectively printing characters associated with the bar-code, comprising the steps of:
   inputting bar-code data including a minimum height for the bar-code and character data including character size;
   storing the input bar-code data and character data;
   adjusting a height of the bar-code based on the stored bar-code data and character data; and
   printing the bar-code with at least a minimum height and selectively printing the associated characters based on the adjusted height of the bar-code.

19. The method of printing of claim 18, wherein adjusting the height of the bar-code includes the steps of combining bar-code data and character data and determining a total height of the bar-code and associated characters.

20. The method of claim 19, wherein combining bar-code data and character data comprises the steps of:
   calculating a net height of the bar-code based on the total height of the bar-code and associated characters and the size of the associated characters;
   deleting a portion of the bar-code when determining that the net height exceeds the minimum net height of the bar-code; and
   inserting the character data associated with the bar-code into the deleted portion of the bar-code.

* * * * *